United States Patent

[11] 3,552,540

| [72] | Inventor | Robert J. Piper |
| | | Detroit, Mich. |
| [21] | Appl. No. | 746,125 |
| [22] | Filed | July 19, 1968 |
| [45] | Patented | Jan. 5, 1971 |
| [73] | Assignee | Stearns Manufacturing Co., Inc. |
| | | Flat Rock, Mich. |
| | | a corporation of Michigan |

[54] CONVEYOR SYSTEM FOR ARTICLES
10 Claims, 2 Drawing Figs.

[52] U.S. Cl. .................................................. 198/102, 209/125
[51] Int. Cl. .................................................. B07c 7/00, B65g 37/00
[50] Field of Search .......................................... 198/75, 78, 81, 102; 186/(Inquired); 209/125

[56] References Cited
UNITED STATES PATENTS

| 2,372,789 | 4/1945 | Mitchell | 198/78X |
| 3,223,225 | 12/1965 | Clark | 198/78X |
| 3,260,349 | 7/1966 | Meer | 198/38 |

Primary Examiner—Edward A. Sroka
Attorney—Hauke, Gifford and Patalidis

ABSTRACT: A conveyor system for baggage including a main conveyor adapted to move bags through an area where they are displayed so that their owners may claim them. Those bags which are not removed pass on to and are returned to a point on the main conveyor upstream of the display area. Control means are provided for giving priority on the main conveyor to bags which are newly introduced to the system over those bags being returned by the secondary conveyor.

INVENTOR
ROBERT J. PIPER

BY Hauke, Kraus, Gifford, & Patalidis

ATTORNEYS

INVENTOR
ROBERT J. PIPER

CONVEYOR SYSTEM FOR ARTICLES

BACKGROUND OF THE INVENTION

1. Field of the Invention

This invention relates to conveyors and more particularly to a system of conveyors for moving articles through a display and claim area and recirculating the articles not claimed through this area.

2. Description Of The Prior Art.

In the past baggage at airport terminals has been placed upon stationary counters to be claimed by the incoming passengers. When a large number of passengers arrive at the same time this arrangement causes a great deal of confusion and wasted time to the passengers as it requires everyone to walk along the counters searching for their bags at the same time.

An improvement on this arrangement provides a closed loop conveyor passing through a claim area where passengers may stand beside the conveyor and remove their bags as they move past. This system has the disadvantage of continually recirculating bags which have not been claimed by passengers through the display area so that the closed loop conveyor becomes filled with recirculating bags and leaves no space for new bags that have not passed through the display area.

SUMMARY

The present invention overcomes this difficulty of the prior art by providing a system which includes a main conveyor running through the display area for display of the bags as they are moved along. As in previous systems passengers may line up along the main conveyor in the display area and remove their bags as they are moved past.

When the bags have passed through the display area without being removed from the main conveyor by their owners, they are automatically placed on a secondary conveyor system comprised of three separate serially arranged sections, an intermittent conveyor, a slow conveyor, and a feed-on conveyor, all of which are usually running. The intermittent conveyor receives and stores unclaimed bags coming from the main conveyor. The slow conveyor connects the intermittent conveyor to the feed-on conveyor, which is connected to the main conveyor upstream of the display area and operative to place the unclaimed bags on the main conveyor for recirculation through the display area. A loading conveyor is connected to the main conveyor upstream of the connection of the feed-on conveyor to the main conveyor for placing uncirculated baggage on the main conveyor.

A photoelectric detector is provided immediately upstream of the connection between the feed-on conveyor and the main conveyor and operative to sense spaces between the new bags coming from the loading conveyor. A second photoelectric detector is provided at the end of the feed-on conveyor connected to the main conveyor. When the second detector senses a bag on the end of the feed-on conveyor, all three separate sections of the secondary conveyor system are deenergized. When a space is sensed by the first detector the feed-on conveyor is energized so that the bag on the end of the feed-on conveyor is placed into the space sensed.

A third photoelectric detector is provided for sensing a bag on the slow conveyor and operates to deenergize the intermittent conveyor when the bag is sensed. The bag continues down the slow conveyor and onto the feed-on conveyor. When the bag reaches the end of the feed-on conveyor and is sensed by the second detector, both the slow and feed-on conveyor are deenergized.

A fourth photoelectric detector is provided at the beginning of the intermittent conveyor, which is connected to the main conveyor. When the intermittent conveyor is energized, the fourth detector does not affect the operation of the secondary conveyor system. When the intermittent conveyor is deenergized and a bag is received by the intermittent conveyor from the main conveyor, the fourth detector senses this bag and energizes the intermittent conveyor until the bag is moved away from the beginning.

The secondary conveyor system receives and stores unclaimed bags until a space is sensed between the uncirculated bags. An unclaimed bag is then automatically put into this space. The system thus recirculates unclaimed bags through the display area but has the advantage of giving priority to uncirculated bags and thus preventing the main conveyor from becoming filled with unclaimed bags.

DESCRIPTION OF THE PREFERRED EMBODIMENT

Figure 1:
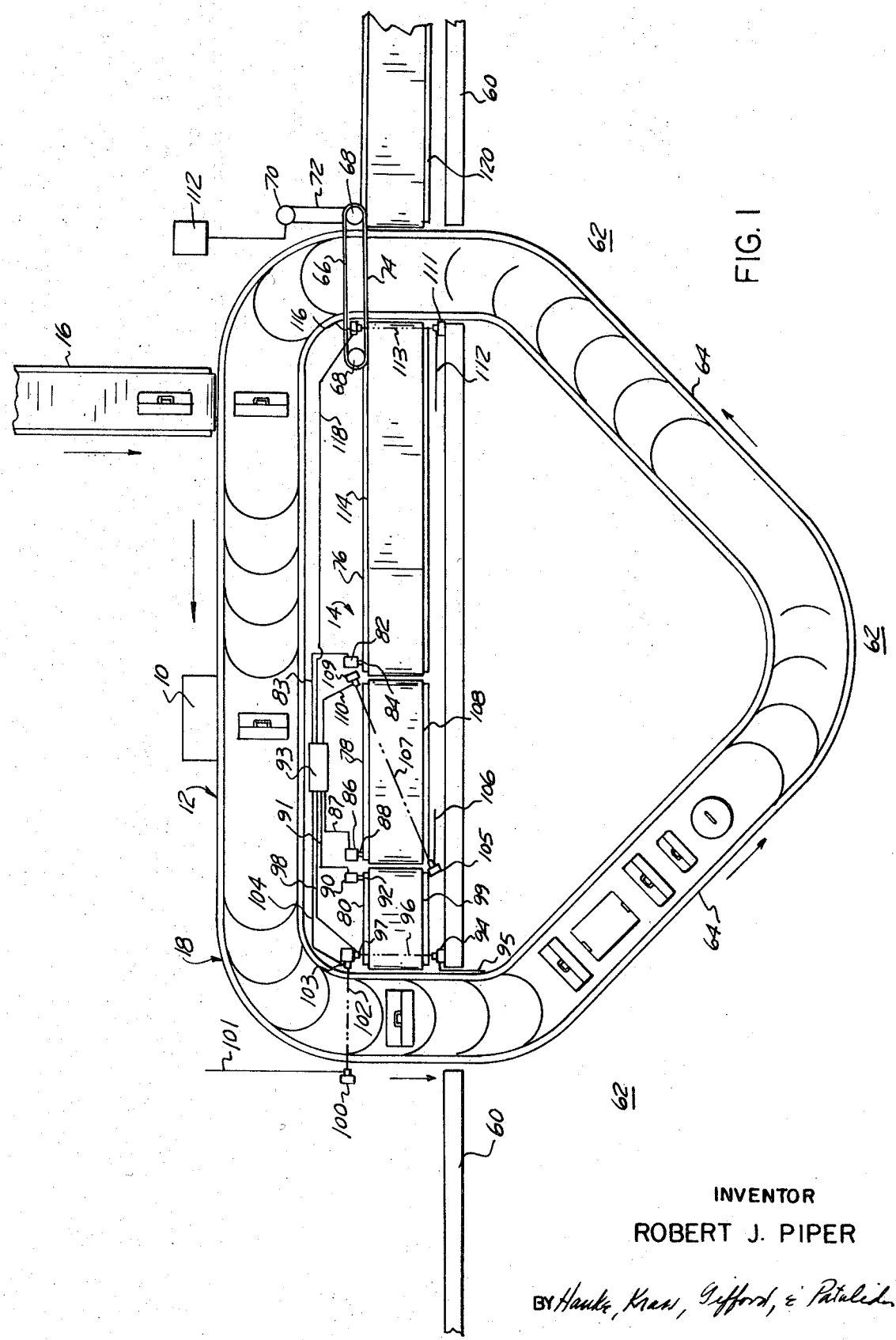
FIG. 1 is a schematic plan view of a conveyor system illustrating a preferred embodiment of the present invention.

Referring to FIG. 1, a preferred embodiment of the conveyor system for baggage broadly comprises a drive mechanism 10 connected to a main conveyor generally indicated at 12, a secondary conveyor generally indicated at 14, and a loading conveyor 16 all of which are mounted on a base member 18.

Figure 2:
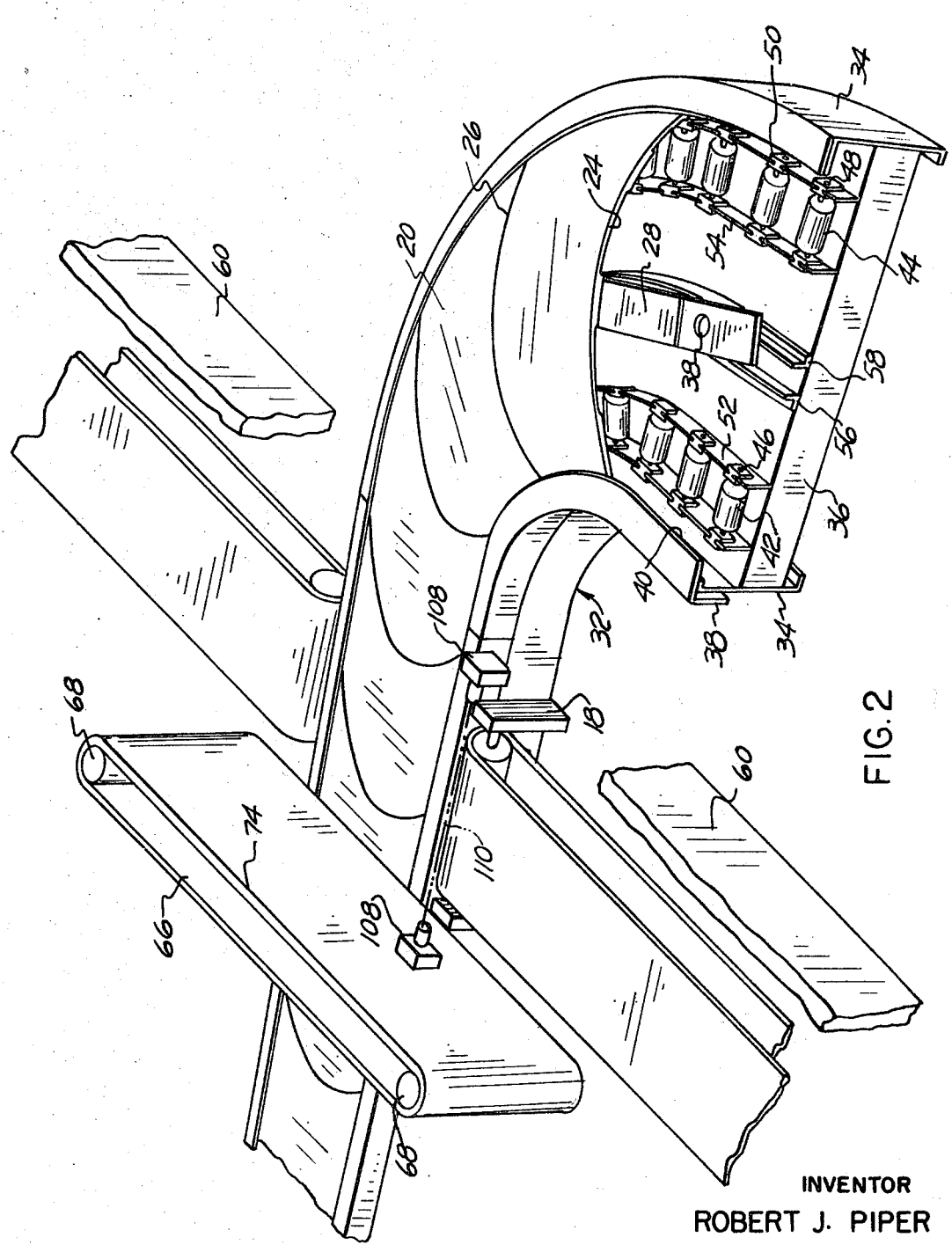
FIG. 2 is a perspective view of a section of the main conveyor with certain of the pallets removed for purposes of better illustration.

The main conveyor 12, which runs continuously during operation of the conveyor system, is preferably constructed as shown in FIG. 2 and more fully disclosed in my copending patent application Ser. No. 679,081. The conveyor is formed of a plurality of pallets 20 each consisting of a pair of parallel sides joined at one end by semicircular, concave surface 24 and at the other end by a semicircular convex surface 26. Each pallet carries a link member 28 with an annular recess 30 for connecting the pallets together and providing a freedom of movement in the horizontal plane. In tranversing a curve the convex and concave surfaces of the pallets rotate with respect to one another such that their configuration prevents any gap from opening between the pallets.

The conveyor 12 includes a frame generally indicated at 32, which includes a series of spaced upright angle iron supports 34 disposed in pairs along the conveyor, the supports 34 retaining the ends of transversely disposed angle irons 36. Paired angle iron members 38 are suitably secured as by welding on the upper portion of the channel members 34 such that the horizontal flange portions 40 thereof extend inwardly over the marginal edge portion of the pallet 20. The transverse channel members 36 extend between the supports 34 and support a plurality of inner rolls 42 and outer rolls 44 which are arranged with their respective shafts 46 and 48 in a horizontal position, perpendicular to the direction of motion of the pallet sections 20. The shafts 46 and 48 are suitably journaled in bearing members 50 retained by the pair of upright support tracks 52 and 54. The tracks 52 and 54 are in the form of continuous plates curved to conform to the contour of the conveyor and supported on the transverse angle members 36. Also suitably supported upon the frame 32 are longitudinal guides consisting of a pair of angle irons 56 and 58 positioned so as to straddle the longitudinal center line of the conveyor. The guide members 56 and 58 have their opposed upstanding flanges separated by approximately the diameter of followers supported on the underside of the pallets. The followers are tracked between the guide sections to guide the pallets along the conveyor course.

The drive mechanism 10 is preferably of the type disclosed in my copending patent application Ser. No. 679,081. My copending application discloses a single drive mechanism positioned along a straight section of the conveyor having drive members thereon to positively engage downwardly extending members from the individual pallets in a successive manner to thereby propel the conveyor.

As described the design of main conveyor 12 lends itself very well to a closed loop conveyor as is illustrated in the preferred embodiment in FIG. 1. An alternative to the closed loop design of the main conveyor 12 can be provided by eliminating the section of conveyor 12 running from conveyor 66 to conveyor 16. The alternative would have no effect on the operation of the conveyor system.

Baggage is delivered to main conveyor 12 by loading conveyor 16, which may be the conventional belt-type conveyor well-known in the art. Conveyor 16 communicates between any convenient baggage-loading platform in the airport with the main conveyor 12. After the baggage is loaded on main conveyor 12 by loading conveyor 16, it is moved in the counterclockwise direction along conveyor 12 and past wall 60 into the display area represented generally by 62. As shown in FIG. 1, wall 60 separates secondary conveyor 14 and part of the main conveyor 12 from the display area 62, although wall 60 is not essential to the operation of the invention.

The baggage moves counterclockwise through the display area 62 on elongated section 64 of conveyor 12 along which passengers may stand and remove their bags as they are conveyed past. The bags that are not removed while passing through area 62 are moved past wall 60 and out of the display area 62 where they contact conveyor 66, which is of the conventional belt-type well-known in the art. The vertical conveyor 66, which rotates on rollers 68 and is driven in the clockwise direction by motor 70 through chain 72, provides a vertical moving surface 74 immediately above the pallets 20 and perpendicular to the line of movement of pallets 20. When baggage on main conveyor 12 contacts surface 74 they are pushed from conveyor 12 onto secondary conveyor 14. Although the preferred embodiment uses conveyor 66, it would be possible to eliminate conveyor 66 by curving conveyor 12 so as to run directly into the beginning of conveyor 76. This alternative would have the disadvantage of eliminating the storage conveyor 120, but the rest of the invention would still be operative.

Secondary conveyor 14 preferably comprises three separate sections, an intermittent conveyor 76, a slow conveyor 78, and a feed-on conveyor 80 all of which may be conventional belt-type conveyors well-known in the art. Conveyors 76, 78 and 80 are driven by motors 82, 86 and 90 through drive shafts 84, 88 and 92 respectively. Motors 82, 86 and 90 are connected to automatic control mechanism 93 by wires 83, 87 and 91 respectively. Although secondary conveyor 14 as shown in the preferred embodiment provides a straight line conveyor system from a point on conveyor 12 immediately upstream of vertical conveyor 66 to a second point on conveyor 12 downstream of the intersection of conveyor 12 and conveyor 16, a curved conveyor between these two points would be equally as adequate. Conveyors 76, 78 and 80 are normally continually running to move baggage from the first point on conveyor 12 to the second point on conveyor 12 so that the bags may be recirculated through the display area 62.

Light source 94 connected to a suitable power source by wire 95 forms a beam of light 96 across the end of feed-on conveyor 80. The light beam 96 is received by photoelectric cell 97, which is well-known in the art and connected to control mechanism 93 by wire 98, light beam 96 is being in a horizontal plane immediately above moving surface 99 of conveyor 80 and perpendicular to the movement of baggage on conveyor 80. Control mechanism 93 being within the circuitry art operates to deenergize conveyors 76, 78 and 80 when light beam 96 is broken by a bag moving down conveyor 80.

Light source 100 connected to a suitable power source by wire 101 forms a beam of light 102 across conveyor 12 immediately upstream of the intersection of conveyors 12 and 80. Light beam 102 is received by photoelectric cell 103, which is connected to control mechanism 93 by wire 104, light beam 102 being in a horizontal plane immediately above pallets 20 of conveyor 12 and perpendicular to the movement of baggage down conveyor 12. Control mechanism 93 with photoelectric cell 103 operates to sense spaces between the bags as they are moved down conveyor 12. If a bag is on end of conveyor 80 when a space is sensed by cell 103 and mechanism 93, mechanism 93 energizes conveyor 80 at the proper time moving the bag into the space sensed.

Light source 105 connected to a suitable power source by wire 106 forms a beam of light 107 across slow conveyor 78 in a horizontal plane immediately above the moving surface 108 of conveyor 78 and at an acute angle with the movement of baggage down conveyor 78. The light beam 107 is received by photoelectric cell 109, which is connected to control mechanism 93 by wire 110. Control 93 with photoelectric cell 109 operates to deenergize intermittent conveyor 76 when light beam 107 is broken by a bag moving down conveyor 78.

Light source 111 connected to a suitable power source by wire 112 forms a beam of light 113 across the end of intermittent conveyor 76 in a horizontal plane immediately above the moving surface 114 of conveyor 76 and perpendicular to the movement of baggage down conveyor 76. Light beam 113 is received by photoelectric cell 116, which is connected to control mechanism 93 by wire 118. If there are no bags breaking light beams 96 or 107, conveyors 76, 78 and 80 will be energized. If a bag is then moved from conveyor 12 onto the beginning of the intermittent conveyor 76 by the vertical conveyor 66, the bag will be moved to the slow conveyor 78 by conveyor 76. When the bag breaks light beam 107, intermittent conveyor 76 will be deenergized while the bag continues to move down conveyor 78 and onto conveyor 80. When light beam 96 is broken by the bag, conveyors 78 and 80 will be deenergized. If conveyor 76 is deenergized when a bag is moved from conveyor 12 onto the beginning of conveyor 76, light beam 113 will be broken causing control mechanism to energize conveyor 76 until the bag is moved out of light beam 113.

Although in the preferred embodiment conveyor 16 intersects conveyor 12 upstream of the point where conveyor 80 intersects conveyor 12, it should be recognized that this is not a limiting factor. By moving light source 100 and photoelectric cell 103 from conveyor 12 to a point on conveyor 16 it would be possible to have conveyor 16 intersect conveyor 12 at a point downstream of the intersection of conveyor 80 and conveyor 12.

In operation baggage of incoming passengers is placed by loading conveyor 16 on main conveyor 12 and moved counterclockwise through display area 62 where most of the baggage is claimed by the passengers. The first of the unclaimed bags is moved by conveyor 66 onto intermittent conveyor 76. Since all three sections of the secondary conveyor are energized at this time, the bag is moved down conveyor 76 and onto conveyor 78. When the bag reaches conveyor 78 and breaks light beam 107, intermittent conveyor 76 is deenergized. The bag continues to move down conveyor 78 and onto conveyor 80 where it is moved to the end of conveyor 80 breaking light beam 96 causing conveyor 78 and 80 to be deenergized by mechanism 93. If another bag is unclaimed, it will be moved from conveyor 12 onto conveyor 76 by conveyor 66, where it will be sensed by photoelectric cell 116 causing control mechanism 93 to energize conveyor 76 until the bag is moved out of light beam 113. As more unclaimed bags reach conveyor 76, the intermittent conveyor will be energized until each bag is moved out of light beam 113. When a space is sensed by photoelectric cell 103, the bag on the end of conveyor 80 will be placed in the sensed space. All three sections of the secondary conveyor will then be energized until a bag is moved onto conveyor 78 by conveyor 76. Conveyor 76 will then be deenergized and the entire process repeated.

After a sufficient length of time to allow all bags to pass through display area 62, the direction of rotation of conveyor 66 is reversed by switch 112. The unclaimed bags then coming into contact with surface 74 will be transferred to storage conveyor 120 where the bags will be stored behind wall 60 until claimed by their owners, thus preventing any possible theft of the unclaimed bags.

Although I have described but one embodiment of my invention, it is to be understood that various changes and revisions can be made therein without departing from the spirit of the invention as expressed in the scope of the appended claims.

I claim:
1. A conveyor system for articles, comprising:
a. a first conveyor having a substantially horizontal surface adapted to support and move the articles and including an elongated section for display of the articles;
b. a feed mechanism operatively connected to a first point on said first conveyor for placing the articles on said first conveyor;
c. a second conveyor having a beginning operatively connected to a second point on said first conveyor and an end operatively connected to a third point on said first conveyor so that articles may move from said second point on said first conveyor onto said beginning, said second conveyor being operative to move the article from its beginning to its end so that articles may move from said end onto the third point on said first conveyor; and
d. first means for sensing spaces between articles placed on said first conveyor by the feed mechanism, said means being operatively connected to said second conveyor for controlling said second conveyor so that articles moving from said end onto said third point will fill said spaces.

2. The system as defined in claim 1, wherein said second conveyor includes a plurality of serially arranged sections, a first section disposed at said end of the second conveyor being controlled by said first means.

3. The system as defined in claim 1, wherein said first conveyor is a closed loop conveyor and said horizontal surface is continuously moving at a constant speed during operation of the conveyor system.

4. A conveyor system for articles, comprising:
a first conveyor having a substantially horizontal surface adapted to support and move the articles and including an elongated section for display of the articles;
a feed mechanism operatively connected to a first point on said first conveyor for placing the articles on said first conveyor;
a second conveyor including a plurality of serially arranged sections and having a beginning operatively connected to a second point on said first conveyor and an end operatively connected to a third point on said first conveyor so that articles may move from said second point on said first conveyor onto said beginning, said second conveyor being operative to move the article from its beginning to its end so that articles may move from said end onto the third point on said first conveyor;
first means for sensing spaces between articles placed on said first conveyor by the feed mechanism, said means being operatively connected to a first section of said plurality disposed at the end of said second conveyor for controlling said first section so that articles moving from said end onto said third point will fill said spaces; and
a second means provided for sensing articles at said beginning, said second means being operatively connected to a second section of said plurality disposed at said beginning of said second conveyor for controlling said second section so that articles placed on said beginning are moved beyond said second means.

5. The system as defined in claim 4, wherein a third section of said plurality is disposed between said first and second section, a third means is provided for sensing articles on said third section, said third means being operatively connected to said second section for deenergizing said second section for deenergizing said second section when an article is sensed.

6. A conveyor system for articles, comprising:
a first conveyor having a substantially horizontal surface adapted to support and move the articles and including an elongated section for display of the articles;
a feed mechanism operatively connected to a first point on said first conveyor for placing the articles on said first conveyor;
a second conveyor including three serially arranged sections normally energized and having a beginning operatively connected to a second point on said first conveyor and an end operatively connected to a third point on said first conveyor, a first section disposed at said beginning of the second conveyor and adapted to receive and store articles from said second point on said first conveyor, a second section disposed at said end of the second conveyor and adapted to place articles onto said third point on said first conveyor, and a third section disposed between said first and second sections and operative to move the article from said first section to said second section;
first means for sensing spaces between articles placed on said first conveyor by the feed mechanism, said means being operatively connected to said second section for controlling said second section so that articles moving from said end onto said third point will fill said spaces;
a second means for sensing an article at said end of the second conveyor, said second means being operatively connected to said first, second and third sections to deenergize said sections when an article is sensed, said first means being operative to override said second means and energize the second section so that articles may move from said end onto said third point to fill said spaces;
a third means for sensing articles on said third section operatively connected to said first section to deenergize said section when an article is sensed; and
a fourth means for sensing an article at said beginning of said second conveyor operatively connected to said first section to override said second and third means if said first section is deenergized thereby and energize said first section when an article is sensed by the fourth means until the article has moved beyond said fourth means.

7. The system as defined in claim 6, wherein:
a. said first conveyor is a closed loop conveyor, and said horizontal surface is continuously moving at a constant speed during operation of the conveyor system;
b. said second point on the first conveyor is downstream of said elongated section and upstream of said first point, said third point on the first conveyor is downstream of said first point and upstream of said elongated section, and said second conveyor forms a substantially straight line conveyor system between said beginning and end; and
c. including:
a third conveyor in a substantially vertical plane immediately above said horizontal surface and immediately downstream of said second point, said third conveyor providing a continuously moving surface for transferring articles reaching the second point from the second point to said beginning of the second conveyor;
a fourth conveyor operatively connected to said second point of said first conveyor for receiving and storing articles from the first conveyor when the direction of rotation of said third conveyor is reversed.

8. The system as defined in claim 6, wherein:
a. said first means includes a light source forming a beam of light immediately above said horizontal surface and substantially perpendicular to the movement of articles on said first conveyor and a photoelectric cell across the first conveyor from the light source for receiving the light beam;
b. said second means includes a light source forming a beam of light immediately above said second section and substantially perpendicular to the movement of articles on said second section and a photoelectric cell across the second section from the light source for receiving the light beam;
c. said third means includes a light source forming a beam of light immediately above said third section and at an acute angle with the line of movement of articles on said third section and a photoelectric cell across the third section from the light source for receiving the light beam; and
d. said fourth means includes a light source forming a beam of light immediately above said first section and substantially perpendicular to the movement of articles on the first section and a photoelectric cell across the first section from the light source for receiving the light beam.

9. A conveyor system for articles, comprising:
- a first conveyor having a substantially horizontal surface adapted to support and move the articles and including an elongated section for display of the articles;
- a feed mechanism operatively connected to a first point on said first conveyor for placing the articles on said first conveyor;
- a second conveyor having a beginning operatively connected to a second point on said first conveyor and an end operatively connected to a third point on said first conveyor so that articles may move from said second point on said first conveyor onto said beginning, said second conveyor being operative to move the article from its beginning to its end so that articles may move from said end onto the third point on said first conveyor;
- first means for sensing spaces between articles placed on said first conveyor by the feed mechanism, said means being operatively connected to said second conveyor for controlling said second conveyor so that articles moving from said end onto said third point will fill said spaces; and
- a third conveyor in a substantially vertical plane immediately above said horizontal surface and immediately downstream of said second point, said third conveyor providing a continuously moving surface for transferring all articles reaching the second point from the second point to said beginning of the second conveyor.

10. The system as defined in claim 9, including a fourth conveyor operatively connected to said second point of said first conveyor for receiving and storing articles from the first conveyor when the direction of rotation of said third conveyor is reversed.

SMA-115-A

PO-1050
(5/69)

UNITED STATES PATENT OFFICE
CERTIFICATE OF CORRECTION

Patent No. 3,552,540            Dated      January 5, 1971

Inventor(s)    ROBERT J. PIPER

It is certified that error appears in the above-identified patent and that said Letters Patent are hereby corrected as shown below:

IN THE CLAIMS

Column 5, line 63, delete "for deenergizing said second section"

Signed and sealed this 6th day of April 1971.

(SEAL)
Attest:

EDWARD M. FLETCHER, JR.
Attesting Officer

WILLIAM E. SCHUYLER, JR
Commissioner of Patents